(12) United States Patent
Wouters

(10) Patent No.: US 7,453,867 B2
(45) Date of Patent: Nov. 18, 2008

(54) METHOD FOR REPLACING A TELEPHONE EXCHANGE BY ANOTHER TELEPHONE EXCHANGE

(75) Inventor: Johannes Petrus Bernardus Maria Wouters, Driebergen (NL)

(73) Assignee: Koninklijke KPN N.V., The Hague (NL)

( * ) Notice: Subject to any disclaimer, the term of this patent is extended or adjusted under 35 U.S.C. 154(b) by 275 days.

(21) Appl. No.: 10/547,559

(22) PCT Filed: May 3, 2004

(86) PCT No.: PCT/EP2004/004796

§ 371 (c)(1),
(2), (4) Date: Aug. 30, 2005

(87) PCT Pub. No.: WO2004/100573

PCT Pub. Date: Nov. 18, 2004

(65) Prior Publication Data

US 2006/0165229 A1    Jul. 27, 2006

Related U.S. Application Data

(60) Provisional application No. 60/468,856, filed on May 8, 2003.

(51) Int. Cl.
*H04L 12/66* (2006.01)

(52) U.S. Cl. ..................... 370/352; 379/230

(58) Field of Classification Search ............... 379/219, 379/220.01, 221.01, 222, 224, 229, 242; 370/352–355

See application file for complete search history.

(56) References Cited

U.S. PATENT DOCUMENTS 5,825,780 A * 10/1998 Christie ................. 370/522
5,848,144 A * 12/1998 Ahrens ................. 379/219

FOREIGN PATENT DOCUMENTS

EP          0 435 448         7/1991

* cited by examiner

*Primary Examiner*—Suhan Ni
(74) *Attorney, Agent, or Firm*—Michaelson & Associates; Peter L. Michaelson

(57) ABSTRACT

A method for replacing an existing international telephone exchange (ITNC) with a new ITNC. Specifically, the new ITNC is first configured off-line to have the same point-code and administrative name as the existing ITNC has. Then, a network operator, through conventional signaling procedures, reduces the amount of traffic routed to that existing ITNC to zero and directs that traffic to other ITNCs in the same domain as the ITNC being replaced. Thereafter, the new ITNC is installed in the domain. Once installation is complete, the new ITNC is brought into operation with traffic then being routed to it. Because the new ITNC has the same corresponding point-code as did the existing ITNC, advantageously no change to network routing tables of other network operators is required to accommodate the replacement.

10 Claims, 3 Drawing Sheets

METHOD FOR REPLACING A TELEPHONE EXCHANGE BY ANOTHER TELEPHONE EXCHANGE

FIELD OF THE INVENTION

The method according to the present invention relates to a method for replacing a telephone exchange in an infrastructure by another telephone exchange.

BACKGROUND OF THE INVENTION

Replacing an existing telephone exchange is a very time consuming and costly process. In particular, this is the case if the telephone exchange is an international telephone exchange (ITNC). Existing methods for replacing an operational international telephone exchange are based on the idea that the new ITNC and the old ITNC are running simultaneously during a period that can last for several months or even years. During such a transition period, both ITNC's handle a part of the traffic. As a consequence, the point-codes of both ITNC's have to be known by other operators.

A point-code is used in a signaling network to identify so-called signaling points. A signaling network operates a telecommunication network in such a way that the telecommunication network can transfer user traffic between telephone switches. The signaling information that is exchanged across a signaling network is used for call set-up, congestion control, and many other purposes. Signaling information is also used in Intelligent Networks (IN's). A system for transferring signaling information between telephone switches and/or other network elements in a telecommunication network is called a signaling system. A signaling system is a network consisting of signaling points. A commonly used signaling system is Signaling System No. 7 (SS7). In SS7, the telephone exchanges have assigned a code that is called a "point-code". Signaling messages contain point-codes for identifying the source (source point-code or SPC) and the destination (destination point-code or DPC) of the signaling message.

The operator, that operates the ITNC that has to be replaced and the new ITNC, should announce the point-code of the new ITNC to the other operators before the replacement process starts. After being informed about the new ITNC, all the other operators have to update their routing tables and their administrations with the new point-code. This task consumes considerable time and effort by the other operators. During a transition phase, other operators will route a part of the traffic to the old ITNC and another part of the traffic to the new ITNC. The amount of traffic that is routed to the old ITNC will be gradually decreased. At the end of the transition phase, all the traffic will be routed to the new ITNC. Different operators can be in different stages during this process. While some operators route their part of the traffic to the old ITNC, other operators already route all their traffic to the new ITNC. It is therefore clear that the existing method for replacing an ITNC is a complex process.

In US 2002/0031145, a method and a software product are disclosed for converting point-codes. This disclosure addresses measures that can be taken when a network-architecture is changed or when problems occur in a network. This is, for example, the case if the status of a telecommunication link in the network-architecture is changed, e.g., as a result of a failure or a network configuration action. In such cases, the signaling system is adjusted to the new situation in the network. This adjustment requires the conversion of point-codes so that telecommunications traffic can be re-routed. A drawback is that the measures according to this prior art do not relate to the replacement of a telephony exchange by another telephony exchange in the network.

SUMMARY OF THE INVENTION

It is an object of the invention to eliminate the drawbacks of the prior art and to provide an efficient method for replacing a telephony exchange by another telephony exchange in a network.

In accordance with the present invention, a method is disclosed for replacing a telephony exchange by another telephony exchange in a network. For this purpose the present invention comprises a method for replacing an existing telephone exchange by a new telephone exchange in a domain of an operator, the method comprising the steps of:
- configuring the new telephone exchange before it is brought into operation;
- reducing the amount of traffic routed via the existing telephone exchange to zero during a period of time, while increasing during that period the amount of traffic routed via other telephone exchanges in the domain;
- replacing the new telephone exchange in the telecommunication network after having reduced to zero the amount of traffic routed via the existing telephone exchange.

In a first aspect of the invention, a method is disclosed for replacing a telephone exchange by another telephone exchange. According to the present invention, this can be accomplished in a relatively simple way without the need to make use of a new point-code.

The method according to this invention requires no new point-code to be communicated by the operator that replaces the ITNC to other operators worldwide. A step of this method is to configure the new ITNC while it is not in operation. The new ITNC can be configured the same or almost the same as the ITNC to be replaced. From the point of view of other operators, the ITNC will then be the same after it is placed into operation. The correspondence between the new ITNC and the ITNC to be replaced comprises the point-code and an administrative name that are the same for both ITNC's.

Another step of the method is to reduce during a certain period the amount of traffic, routed via the ITNC to be replaced, to zero. This results in all the traffic to be routed via another ITNC at the end of this period. After this, the new ITNC can be installed in the telecommunication network. During the installation, all the traffic is routed by one or more other ITNC's contained by the domain of the operator that replaces the ITNC to be replaced. A next step is bringing the new ITNC into operation. Because the new ITNC has both the same point-code corresponding to it and the same administrative name as the ITNC to be replaced had before, the situation after the new ITNC is brought into operation is the same as the old situation with regard to most signaling—and administrative aspects. Another advantage of the method according to this invention is that there is not a long period during which a new ITNC is in operation in parallel with the ITNC that had to be replaced.

BRIEF DESCRIPTION OF THE DRAWING FIGURE

The foregoing aspects and many of attendant advantages of this invention will be readily understood by reference to the following detailed description, when taken in conjunction with the accompanying drawing, wherein.

DETAILED DESCRIPTION

For the purpose of teaching of the invention, preferred embodiments of the method and devices of the invention are described in the sequel. It will be apparent to the person skilled in the art that other alternative and equivalent embodiments of the invention can be conceived and reduced to practice without departing form the true spirit of the invention, the scope of the invention being limited only by the appended claims as finally granted.

Figure 1:
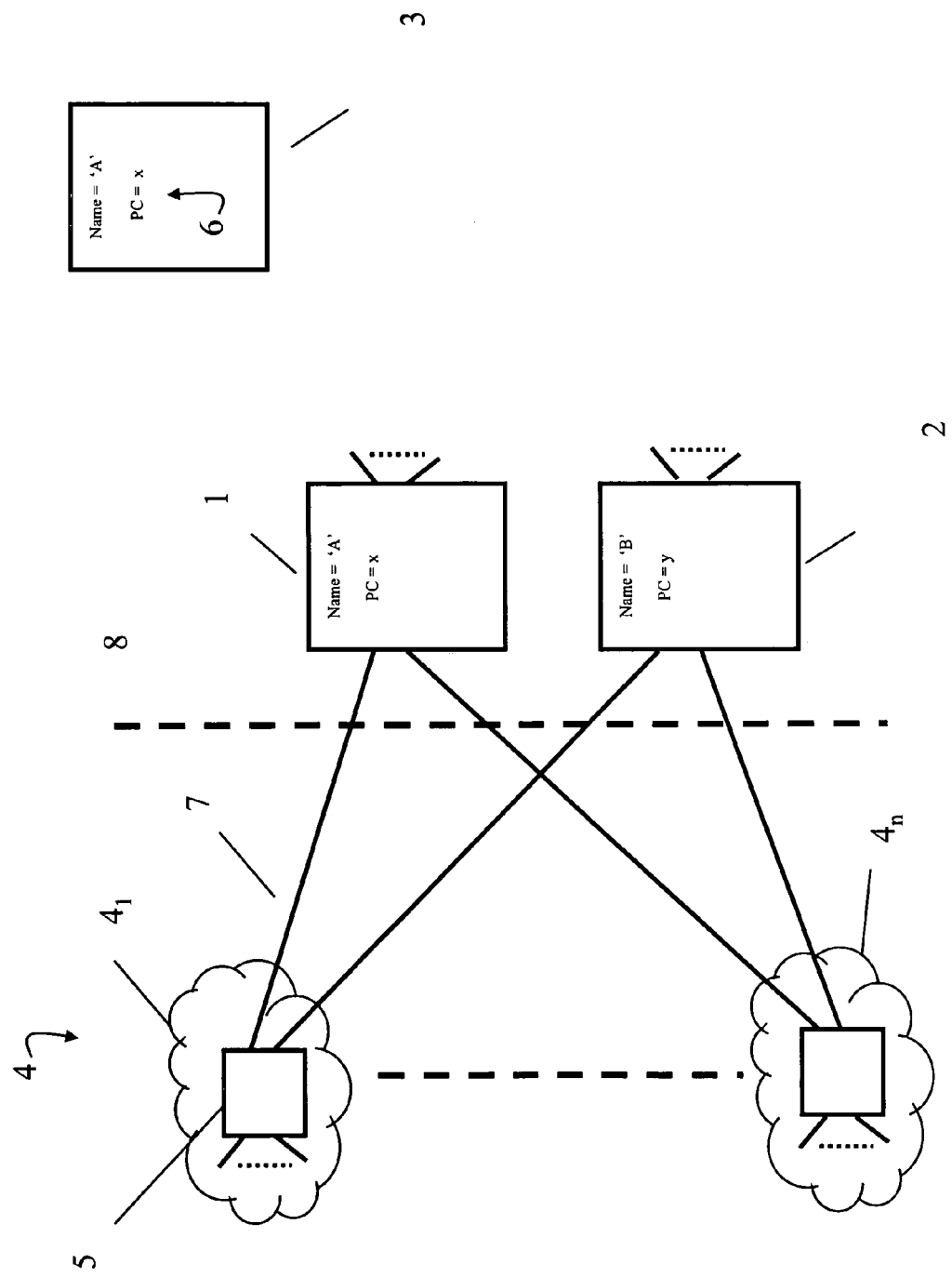
FIG. 1 is a telecommunications network is depicted comprising telecommunication nodes and telecommunication links.

FIG. 1 depicts a situation where an existing ITNC (1) is in operation. The ITNC (1) is the ITNC to be replaced. There is another ITNC (2) that is also in operation. Both ITNC (1) and (2) are part of a domain (8) of the operator that is about to replace ITNC (1). The total amount of operational ITNC's is not limited to two. In FIG. 1, the operational ITNC's can be used for load sharing or fall-back for the handling of international traffic. The existing ITNC (1) is connected via a telecommunication link (7) to at least one ITNC (5) in the domain ($44_1$) of another operator. As an example, a limited number of telecommunication links to domains (4, constituting Domains $4_1$ to $4_n$) of other operators are also depicted. In practice, the number of other operator domains (4) can be very large.

There is a new ITNC (3) that should replace the existing ITNC (1). At this stage, the new ITNC (3) is not in operation and is not connected to other ITNC's. Each ITNC has a corresponding parameter list (6) comprising the point-code (PC) of the ITNC and the name of the ITNC. The name of the ITNC can be used for administrative and operational purposes, while the point-code can used in behalf of the exchange of signaling information.

Figure 2:
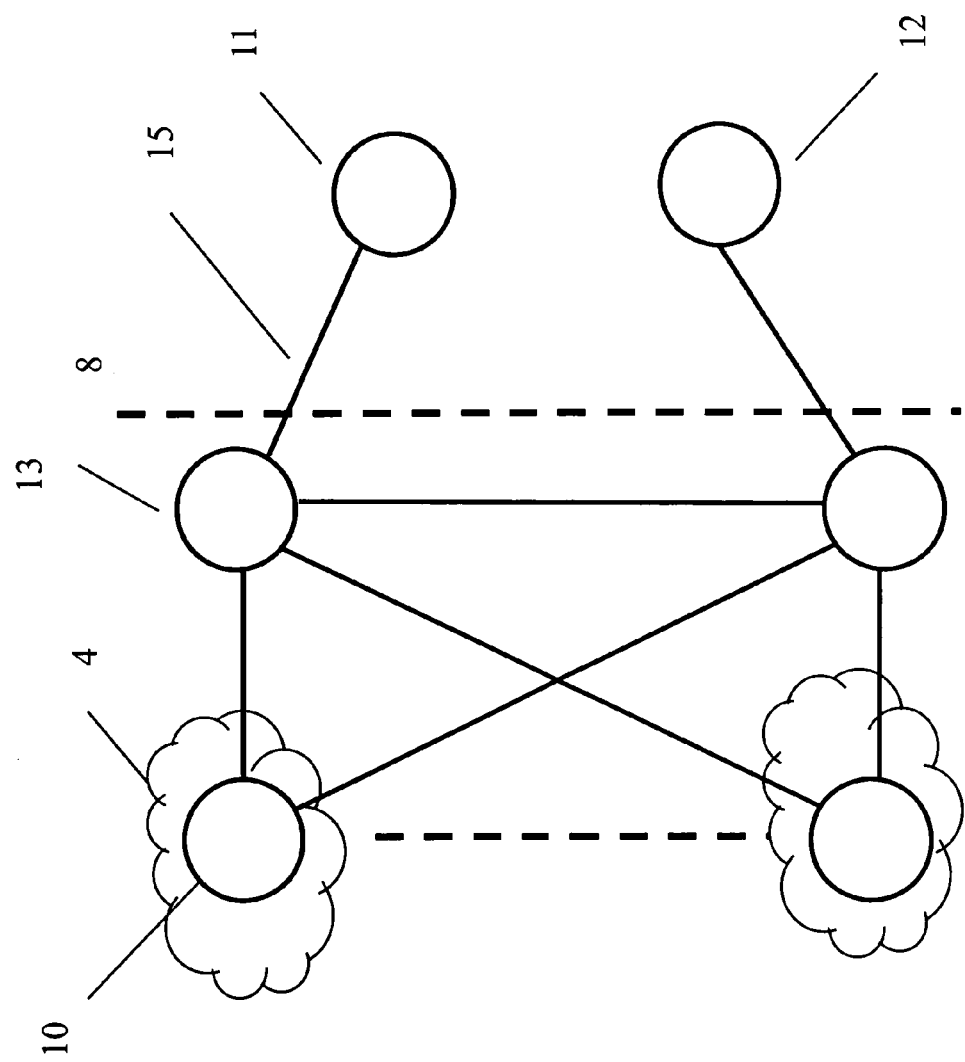
FIG. 2 shows the telecommunications network from a signaling point of view.

FIG. 2 contains a conceptual representation of the signaling network used for the exchange of signaling information between the ITNC's depicted in FIG. 1. There are more signaling points depicted in FIG. 2 than there are ITNC's in FIG. 1, because there can be signaling points in a signaling network that do not have ITNC. These signaling points act, in general, like a transfer point for signaling information, i.e., signaling is then not terminated at these signaling points. In SS7, the transfer signaling points are called STP's (Signaling Transfer Points). A signaling point (11) and a signaling point (12) in the domain (8) are connected to other signaling points. The signaling point (11) corresponding to ITNC (1) is connected with a signaling link (15) to a signaling point (13). Signaling point (13) can be an STP, and although signaling point (13) is depicted outside the domain (8) it could be part of the domain of another operator. A signaling point (10) corresponds to the ITNC (5) in the domain of another operator.

According to the method of this invention, the new ITNC (3) will be prepared off-line before being placed in the operational network. The off-line preparations of the new IT (3) comprises configuration activities, such as but not limited to, the connection of telecommunication links, the definition of routing-table content, software installation, and hardware installation. The new ITNC (3) can be configured exactly identical or almost identical to the existing ITNC (1), although it is also possible that the new ITNC (3) is configured different than the existing ITNC (1). In FIG. 1, it can be seen that the point-code corresponding to ITNC (3) equals that of ITNC (1). If the existing ITNC (1) is replaced by the new ITNC (3), it will result in a new situation, where there is no or almost no difference from the point of view of other operators between the old and the new situation.

Another step of the method is to reduce during a certain period the amount of traffic that is routed to and from the existing ITNC (1). During this period, the amount of traffic routed via one or more other ITNC's that are in operation in domain (8) will be increased stepwise. In FIG. 1, it is ITNC (2) that receives an increasing traffic load during the period. At the end of that period, all the traffic will be routed to and from the other ITNC (2) and the amount of traffic routed to and from ITNC (1) will have been reduced to zero. Generally, there are procedures in signaling networks that can handle situations where no traffic or just a part of the traffic has to be routed to specific ITNC.

The operator replacing ITN (1) by ITNC (3) can inform other operators about the planned replacement. Informing the other operators is not necessary if, and this is often the case, there are automatic procedures in the signaling network that enable the reduction of the amount of traffic routed to a specific signaling point. Relying on these automatic procedures, no complex measures need to be taken by the other operators as a response to the planned replacement of the ITNC (1).

After the amount of traffic routed to ITNC (1) is reduced to zero, it is possible to replace the existing ITNC (1) by the new ITNC (3). The installation of ITNC (3) comprises, amongst many other things, the transfer of telecommunication links terminating at the existing ITNC (1) from the existing ITNC (1) to the new ITNC (3). The period that it takes to install the ITNC (3) in the telecommunication network can be relatively short since the ITNC (3) has already been pre-configured beforehand. In the signaling network, the point-code corresponding to the existing ITNC (1) will not be used in this period as a destination point-code. On the other hand, the point-code of the other ITNC (2) will be used as the destination code for all the traffic to be routed. No additional point-code is used during this period, so there is no need for other operators to update their routing software and administrative systems.

Figure 3:
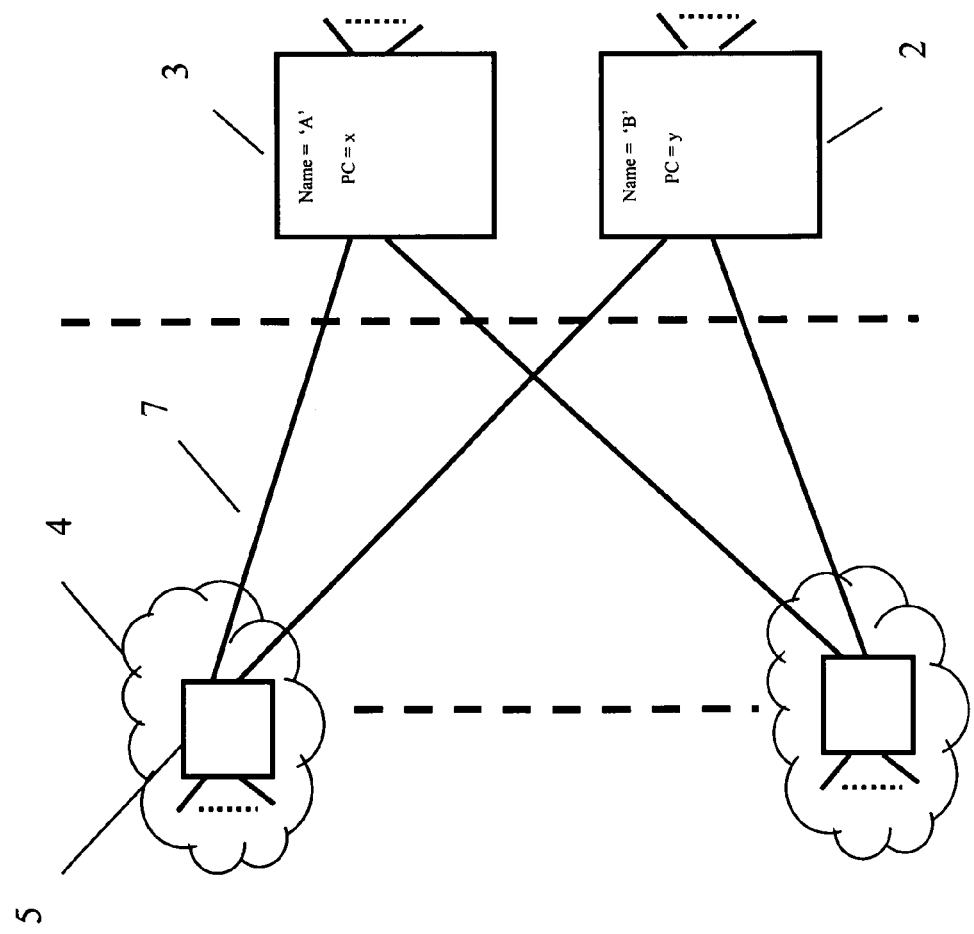
FIG. 3 shows a telecommunications network after a network node has been replaced by another network node.

When the installation of the new ITNC (3) is complete, the ITNC (3) can be brought into operation. Before bringing the ITNC (3) into operation, it is possible to perform one or more tests. In general, the systems of other operators will be informed via the signaling network about the fact that ITNC (3) is in operation. When the ITNC (3) is in operation, the point-codes of both ITNC (2) and the new ITNC (3) will be used in systems (e.g., by routing tables) of the other operators to route traffic using the signaling network. This can been seen in FIG. 3 where depicts the situation that exists after the ITNC (1) is replaced and the ITNC (3) is in operation. Since the new ITNC (3) has the same administrative name and uses the same point-code as the existing ITNC (1) which is now replaced, there is no difference from the other operators' perspective between this new situation and the old situation where the existing ITNC (1) was in operation. The systems will use, in the new situation, the same point-codes referring to the ITNC's in domain (8), as was the case in the old situation where ITNC (1) was in operation. Avoiding the use of a new point-code to be introduced results in a simpler procedure for the replacement of an ITNC than otherwise. This is advantageous for the operator that replaces the ITNC and for the other operators as well. The other operators need not update their operational and administrative systems with a new point-code or a new name for the new ITNC (3). Instead, the other operators only have to take care that the point-code corresponding to ITNC (1) and ITNC (3) is not used during a certain period.

As it is discussed before, typical for a transition period is that the telephony exchange to be replaced and the new telephony exchange operate simultaneously which is very complex and time consuming for the operator that has to replace an ITNC. According to the present invention, there will be in practice no period during which both telephony exchanges are operated simultaneously. Therefore, an advantage of the present invention is that such a transition period can be avoided.

In the prior art, the transition phase starts when a new ITNC is partly in operation in parallel with other ITNC's, and ends when the new ITNC is fully in operation in parallel with other ITNC's. This transition period can take up to several years, since such a step-by-step migration scenario requires considerable coordination between the operators that are involved in this process. It also requires extra resource from the operator that replaces the ITNC to have two or more ITNC's in operation during a transition period.

In the method according to this invention there is no transition period in which the telephony exchange to be replaced and the new telephony exchange need to operate simultaneously.

The invention claimed is:

1. A method for replacing, within a telecommunications network, an existing international telephone exchange (ITNC) by a new ITNC, both exchanges being in a domain of an operator, the method comprising the steps of:
   configuring the new ITNC before it is brought into operation and handles traffic in the domain wherein a point-code is allocated to the new ITNC that is the same as a point-code that has been previously allocated to the existing ITNC so that the operator need not communicate any change to the point-code for the new ITNC to any other operator in the network;
   reducing an amount of traffic routed via the existing ITNC to zero during a period of time, while increasing during said period an amount of traffic routed via other ITNCs in the domain;
   replacing, in the domain and the network, the existing ITNC with the new ITNC, after the amount of the traffic routed via the existing ITNC has been reduced to zero; and
   allowing traffic to be routed to the new ITNC after the new ITNC has replaced the existing ITNC.

2. The method recited in claim 1 wherein, during the configuring step, the new ITNC is configured identically to the existing ITNC.

3. The method recited in claim 2 wherein the reducing step comprises the step of increasing the traffic handled by the other ITNCs in a step-wise fashion until the traffic handled by the existing ITNC is decreased to zero.

4. The method recited in claim 1 wherein the configuring step comprises the step of allocating an administrative name to the new ITNC which is the same as an administrative name previously allocated to the existing ITNC.

5. The method recited in claim 4 wherein the reducing step comprises the step of increasing the traffic handled by the other ITNCs in a step-wise fashion until the traffic handled by the existing ITNC is decreased to zero.

6. A method for replacing, within a telecommunications network, an existing international telephone exchange (ITNC) by a new ITNC, both exchanges being in a domain of an operator, the method comprising the steps of:
   configuring the new ITNC before it is brought into operation and handles traffic in the domain comprising the steps of:
      allocating a point-code to the new ITNC that is the same as a point-code which has been previously allocated to the existing ITNC so that the operator need not communicate any change to the point-code for the new ITNC to any other operator in the network; and
      allocating an administrative name to the new ITNC which is the same as an administrative name previously allocated to the existing ITNC;
   reducing an amount of traffic routed via the existing ITNC to zero during a period of time, while increasing during said period an amount of traffic routed via other ITNCs in the domain;
   replacing, in the domain and the network, the existing ITNC with the new ITNC, after the amount of the traffic routed via the existing ITNC has been reduced to zero; and
   allowing traffic to be routed to the new ITNC after the new ITNC has replaced the existing ITNC.

7. The method recited in claim 6 wherein, during the configuring step, the new ITNC is configured identically to the existing ITNC.

8. The method recited in claim 7 wherein the reducing step comprises the step of increasing the traffic handled by the other ITNCs in a step-wise fashion until the traffic handled by the existing ITNC is decreased to zero.

9. A method for replacing, within a telecommunications network, an existing international telephone exchange (ITNC) by a new ITNC, both exchanges being in a domain of an operator, the method comprising the steps of:
   configuring the new ITNC before it is brought into operation and handles traffic in the domain such that the new ITNC is configured identically to the existing ITNC, wherein the configuring step comprises the steps of:
      allocating a point-code to the new ITNC that is the same as a point-code which has been previously allocated to the existing ITNC so that the operator need not communicate any change to the point-code for the new ITNC to any other operator in the network; and
      allocating an administrative name to the new ITNC which is the same as an administrative name previously allocated to the existing ITNC;
   reducing an amount of traffic routed via the existing ITNC to zero during a period of time, while increasing during said period an amount of traffic routed via other ITNCs in the domain;
   replacing, in the domain and the network, the existing ITNC with the new ITNC, after the amount of the traffic routed via the existing ITNC has been reduced to zero; and
   allowing traffic to be routed to the new ITNC after the new ITNC has replaced the existing ITNC.

10. The method recited in claim 9 wherein the reducing step comprises the step of increasing the traffic handled by the other ITNCs in a step-wise fashion until the traffic handled by the existing ITNC is decreased to zero.

* * * * *